(12) United States Patent
Tsai et al.

(10) Patent No.: US 6,885,378 B1
(45) Date of Patent: Apr. 26, 2005

(54) METHOD AND APPARATUS FOR THE IMPLEMENTATION OF FULL-SCENE ANTI-ALIASING SUPERSAMPLING

(75) Inventors: Hsin-Chu Tsai, Folsom, CA (US); Subramaniam Maiyuran, Gold River, CA (US); Chung-Chi Wang, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 452 days.

(21) Appl. No.: 09/675,096

(22) Filed: Sep. 28, 2000

(51) Int. Cl.⁷ .............................................. G09G 5/36
(52) U.S. Cl. ................. 345/557; 345/541; 345/542; 345/543; 711/113; 711/118; 711/130; 711/147
(58) Field of Search ...................... 345/557, 541–543, 345/552, 422, 423; 711/113, 118, 130, 147

(56) References Cited

U.S. PATENT DOCUMENTS

| | | | | |
|---|---|---|---|---|
| 5,287,438 A | * | 2/1994 | Kelleher | 345/613 |
| 5,307,451 A | | 4/1994 | Clark | 395/127 |
| 5,651,104 A | * | 7/1997 | Cosman | 345/428 |
| 5,682,522 A | * | 10/1997 | Huang et al. | 345/552 |
| 5,828,382 A | * | 10/1998 | Wilde | 345/552 |
| 5,860,060 A | * | 1/1999 | Li et al. | 704/500 |
| 5,959,639 A | * | 9/1999 | Wada | 345/542 |
| 5,960,213 A | | 9/1999 | Wilson | |
| 5,977,977 A | | 11/1999 | Kajiya et al. | 345/418 |
| 5,986,677 A | * | 11/1999 | Jones et al. | 345/531 |
| 6,094,203 A | * | 7/2000 | Desormeaux | 345/501 |
| 6,104,417 A | * | 8/2000 | Nielsen et al. | 345/542 |
| 6,111,584 A | | 8/2000 | Murphy | |
| 6,219,062 B1 | * | 4/2001 | Matsuo et al. | 345/426 |
| 6,448,968 B1 | * | 9/2002 | Pfister et al. | 345/423 |
| 6,483,516 B1 | * | 11/2002 | Tischler | 345/552 |
| 6,496,187 B1 | * | 12/2002 | Deering et al. | 345/419 |
| 6,498,606 B1 | * | 12/2002 | Penna et al. | 345/422 |

FOREIGN PATENT DOCUMENTS

EP 0821324 A2 1/1998 .......... G06T/15/10

OTHER PUBLICATIONS

PCT Search Report, PCT/US 01/30360, Apr. 24, 2005, 5 pps.

Ikedo et al., "An Advanced Graphics Chip with Bump–mapped Phong Shading", 1997 IEEE, pps. 156–165.

* cited by examiner

*Primary Examiner*—Matthew C. Bella
*Assistant Examiner*—Mackly Monestime
(74) *Attorney, Agent, or Firm*—Blakely, Sokoloff, Taylor & Zafman LLP

(57) ABSTRACT

According to one embodiment, a computer system is disclosed. The computer system includes a graphics accelerator and a graphics cache coupled to the graphics accelerator. The graphics cache stores texture data, color data and depth data.

24 Claims, 4 Drawing Sheets

METHOD AND APPARATUS FOR THE IMPLEMENTATION OF FULL-SCENE ANTI-ALIASING SUPERSAMPLING

FIELD OF THE INVENTION

The present invention relates to computer systems; more particularly, the present invention relates to processing three-dimensional graphics.

BACKGROUND

Computer generated graphics are commonly used in various areas of industry, business, education and entertainment. Computer graphics are represented by pixels on a display monitor. However, since the display only contains a finite number of pixels, aliasing may often occur. Aliasing due to having to represent analog data in a digital format, results in a displayed image appearing with jagged edges.

The application of techniques used to reduce aliasing is typically referred to as anti-aliasing. One technique used for full-scene anti-aliasing is known as supersampling. Supersampling is an approach in which an original graphics scene is rendered at a high resolution and subsequently filtered down to the original display resolution. Thus, supersampling essentially shifts the abasing effect up to a higher spatial frequency.

There are, however, performance drawbacks incurred by the computer system while using the supersampling technique. The problem with supersampling is that it requires additional processing and memory storage and bandwidth in order to render an image at higher resolutions, and later filter it down. For example, supersampling two times (2x) in each of an X and Y direction of the display requires four times (4x) the storage and bandwidth. Therefore, an efficient implementation of supersampling without incurring extra memory storage and bandwidth is desired.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for the efficient implementation of supersampling is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
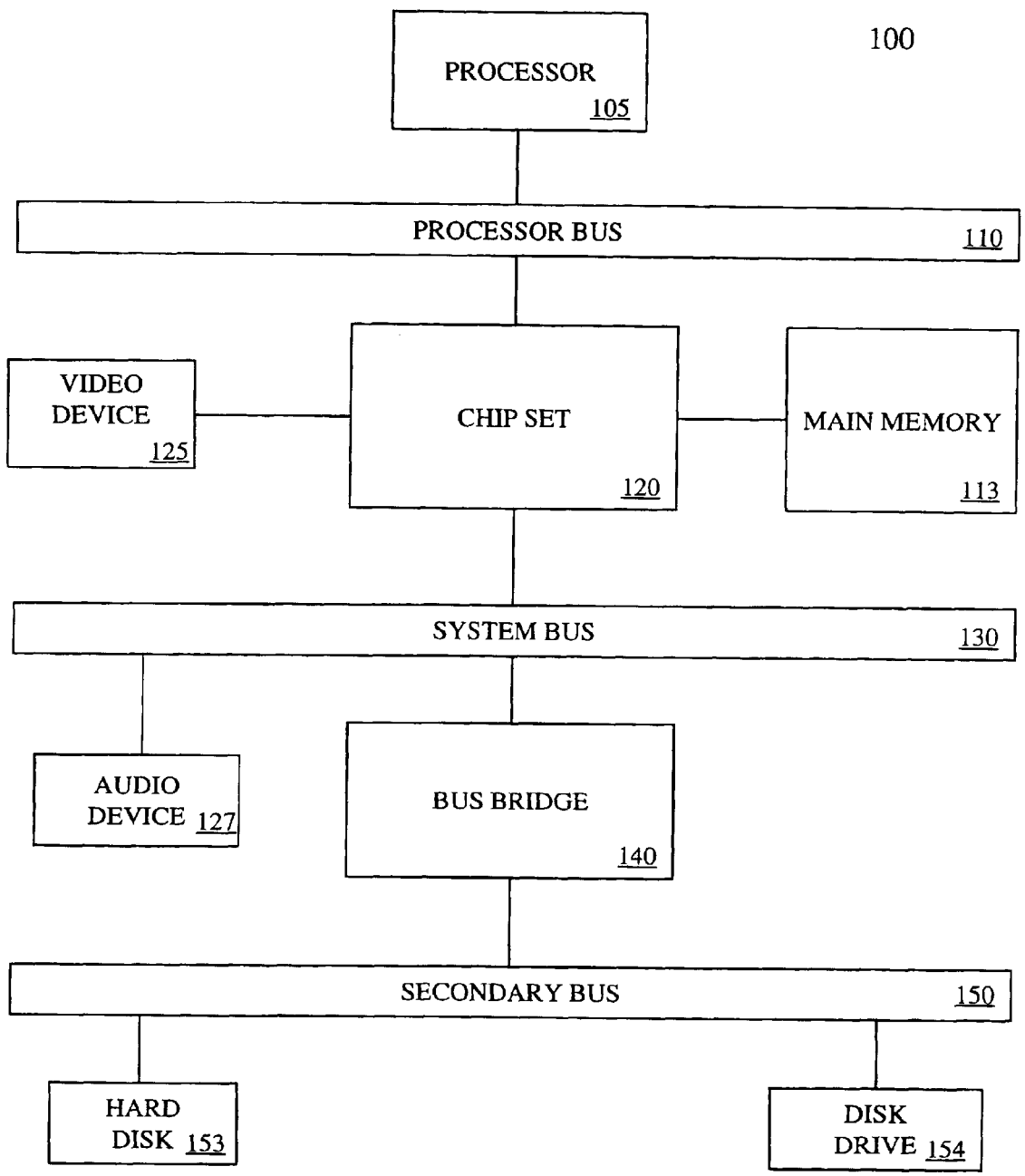
FIG. 1 is a block diagram of one embodiment of a computer system.

FIG. 1 is a block diagram of one embodiment of a computer system 100. Computer system 100 includes a central processing unit (processor) 105 coupled to processor bus 110. In one embodiment, processor 105 is a processor in the Pentium® family of processors including the Pentium® II family and mobile Pentium® and Pentium® II processors available from Intel Corporation of Santa Clara, Calif. Alternatively, other processors may be used.

Chip set 120 is also coupled to processor bus 110. Chip set 120 may include a memory controller for controlling a main memory 113. Further, chipset 120 may also include an Accelerated Graphics Port (AGP) Specification Revision 2.0 interface developed by Intel Corporation of Santa Clara, Calif. Chip set 120 is coupled to a video device 125 and handles video data requests to access main memory 113.

Main memory 113 is coupled to processor bus 110 through chip set 120. Main memory 113 stores sequences of instructions that are executed by processor 105. In one embodiment, main memory 113 includes a dynamic random access memory (DRAM) system; however, main memory 113 may have other configurations. The sequences of instructions executed by processor 105 may be retrieved from main memory 113 or any other storage device. Additional devices may also be coupled to processor bus 110, such as multiple processors and/or multiple main memory devices. Computer system 100 is described in terms of a single processor; however, multiple processors can be coupled to processor bus 110. Video device 125 is also coupled to chip set 120. In one embodiment, video device includes a video monitor such as a cathode ray tube (CRT) or liquid crystal display (LCD) and necessary support circuitry.

Processor bus 110 is coupled to system bus 130 by chip set 120. In one embodiment, system bus 130 is a Peripheral Component Interconnect (PCI) Specification Revision 2.1 standard bus developed by Intel Corporation of Santa Clara, Calif.; however, other bus standards may also be used. Multiple devices, such as audio device 127, may be coupled to system bus 130.

Bus bridge 140 couples system bus 130 to secondary bus 150. In one embodiment, secondary bus 150 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al. Multiple devices, such as hard disk 153 and disk drive 154 may be coupled to secondary bus 150. Other devices, such as cursor control devices (not shown in FIG. 1), may be coupled to secondary bus 150.

Figure 2:
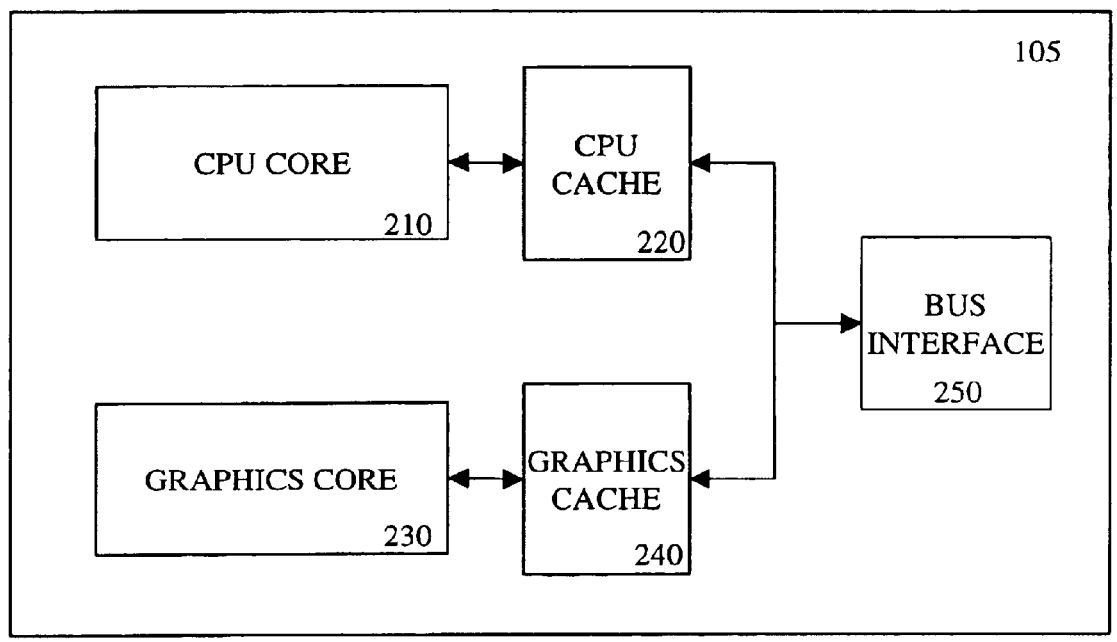
FIG. 2 is a block diagram of one embodiment of a processor.

FIG. 2 is a block diagram of one embodiment of processor 105. Processor 105 includes a CPU core 210, CPU cache 220, graphics core 230, graphics cache 240 and bus interface 250. CPU core 210 executes non-graphic instructions received at computer system 100. CPU cache 220 is coupled to CPU core 210. According to one embodiment, CPU cache 220 is a high-speed storage mechanism for storing data and sequences of instructions executed by CPU core 210.

Bus interface 250 is coupled CPU cache 220. Bus interface 250 connects CPU cache 220 and graphics cache 240 to processor bus 110 such that data may be distributed to and from processor 105.

Graphics core 230 includes a graphics accelerator that is specialized for computing graphical transformations. Graphics core 230 enables CPU core 210 to efficiently execute non-graphic commands, while graphics core 230 handles graphics computations. According to one embodiment, graphics core operates according to a tile-based rendering architecture. Rendering is the act of calculating, on a per pixel basis, different color and position information. As a result, a viewer may perceive depth on the 2D monitor of video device 125.

Rendering fills in the points on the surface of an object that were previously stored only as a set of vertices. In this way, a solid object, shaded for 3D effect, will be drawn on the screen. In order to render an object, it is necessary to determine color and position information. To do this efficiently, the vertices of the object are segmented into triangles and these triangles (set of three vertices) are then processed one at a time at graphics core 230.

In tile-based rendering, graphics core 230 constructs polygons in a particular graphics scene (or image) in a triangle per triangle manner until the scene is completed. However, prior to the rendering of a scene, graphics core 230 breaks down a scene into a series of triangles. Subsequently, the triangles are sorted (or binned) into tiles by examining the bounding box of each triangle. Tile binning determines in which tile(s) a triangle is located. According to one embodiment, graphics cache 240 includes a buffer for each tile in a scene. The buffers include pointers to the particular triangles that are included within the buffers. After each triangle has been binned, each tile of the scene is rendered one at a time.

Graphics cache 240 is coupled to graphics core 230 and bus interface 250. According to one embodiment, graphics cache 240 is a unified graphics cache that can accommodate a tile size of 128×64 pixels, wherein each pixel includes 327 bit color and depth values. In another embodiment, graphics cache 240 stores texture data, in addition to color and depth data. In yet a further embodiment, graphics cache 240 is 64-kilobyte static random access memory for accommodating the 128×64 tile size. However, one of ordinary skill in the art will appreciate that other sizes and types of memory devices may be used to implement graphics cache 240.

Figure 3:
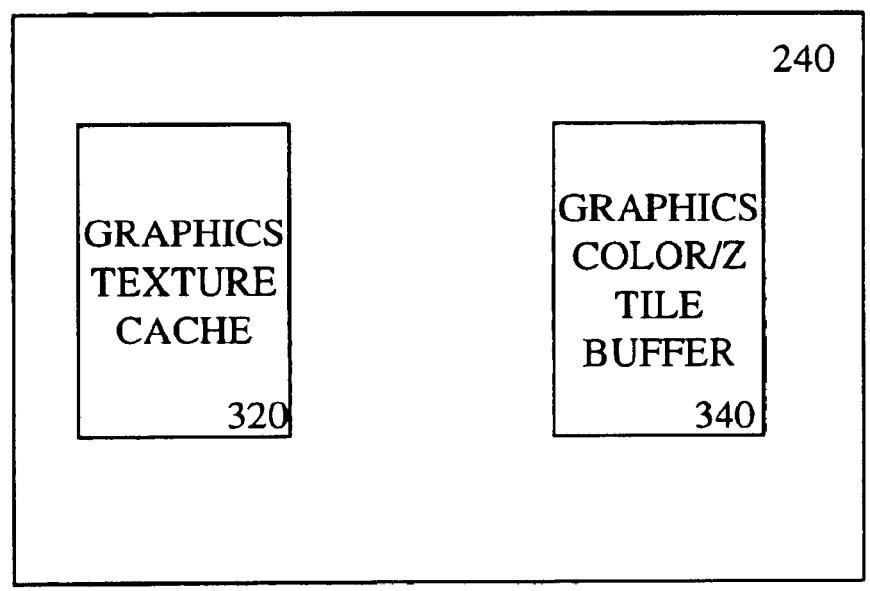
FIG. 3 is a block diagram of one embodiment of a graphics cache.

FIG. 3 is a block diagram of one embodiment of graphics cache 240. Graphics cache 240 includes graphics texture cache 320 and graphics color/Z tile buffer 340. Graphics texture cache 320 stores texture data used for texture mapping of an object. Texture mapping involves encoding a texture with three-dimensional properties (e.g., how transparent and reflective the object is) in addition to two-dimensional qualities, such as color and brightness. Once a texture has been defined, it can be wrapped around a three-dimensional object.

Graphics color/Z tile buffer 340 stores color and depth data for pixels in each tile of one or more graphic scenes. Tile size may be determined based upon color and depth formats and the size of graphics color/Z tile buffer 340. Thus, according to one embodiment, graphics color/Z tile buffer 340 is sufficiently large to fulfill intermediate color and depth data accesses for all triangles that fall inside of a particular tile. According to a further embodiment, the color and depth data is written to memory 113 after the rendering of the last triangle in a tile has been completed.

Figure 4:
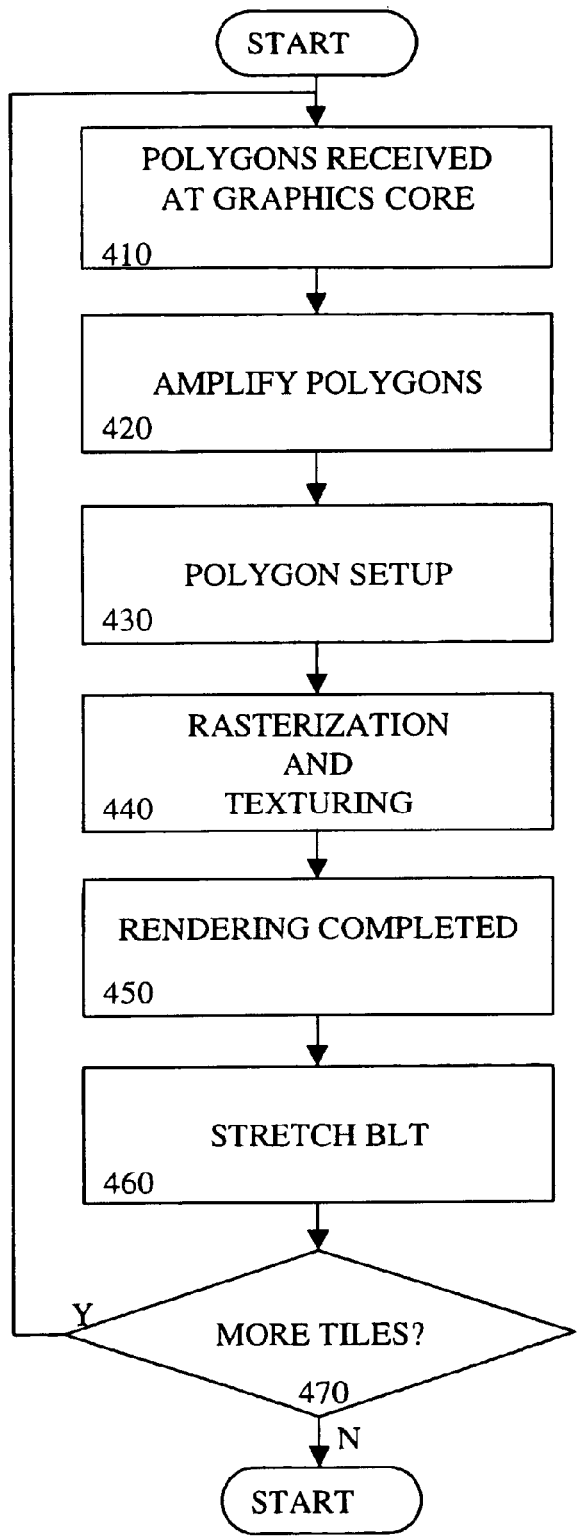
FIG. 4 is a flow diagram of one embodiment of data flow during supersampling.

According to one embodiment, the use of graphics cache 240 enables graphics core 230 to efficiently implement supersampling by eliminating extra memory storage and bandwidth requirements. FIG. 4 is a flow diagram of one embodiment of the data flow during supersampling by graphics core 230. For illustration purposes, a value of k=4 is assumed by supersampling two times (2×) in the X and Y directions. Further, the tile size is assumed to be 128×64, and polygons are binned into a virtual tile size of 64×32. However, one of ordinary skill in the art will appreciate that the process may be implemented using other k values and tile sizes.

Referring to FIG. 4, polygons for a tile are received at graphics core 230 from memory 113 via the AGP port within chipset 120, process block 410. At process block 420, the polygons are amplified at graphics core 230. Since for this example k=4, the polygons are amplified four times (4×) of the original size. The amplification is achieved by using viewport transformation supported by graphics core 230. In viewport transformation, word coordinates are mapped onto the display screen coordinates by graphics core 230. Subsequently, graphics core 230 accelerates the transformation. By applying the viewport transformation, the dimensions of the viewport may be manipulated in order to cause the final image to be enlarged for rendering into tiles.

At process block 430, the enlarged polygons are setup. According to one embodiment, the setup stage takes input data associated with each vertex and computes various parameters required for scan conversion. According to a further embodiment, gradients required to interpolate the various vertex attributes across the polygon are also computed.

At process block 440, texture data for polygon rasterization and texturing is performed at graphics core 230. During rasterization pixels within the polygons are processed. Moreover, texture is applied to the pixels if texturing is enabled. At process block 450, rendering of the tile is completed. After rendering of the last triangle in the tile has been completed, graphics color/Z tile buffer 340 includes the complete image of the tile 4× the original size. At process block 460, a stretch bit aligned block transfer (BLT) is executed. A BLT is a process wherein pixels, or other data, are copied from one memory location to another. The stretch BLT is performed in order to down sample the image from the physical tile size to the virtual tile size.

The stretch BLT is accomplished by rendering a rectangle (made up of two polygons) of the size equal to that of the physical tile size. The supersampled image in the physical tile (e.g., in graphics color/Z tile buffer 340) is considered the source of the stretch BLT, while the destination is allocated in memory 113. According to one embodiment, graphics core 230 treats the source of the stretch BLT as a texture map for the destination for the destination rectangle. As a result, graphics texture cache 320 is maintained undisturbed in order to maintain good utilization of the texture data across tiles.

At process block 470, it is determined whether more tiles in graphics color/Z tile buffer 340 need to be rendered. If it is determined that more tiles need to be rendered, control is returned to process block 410 where polygons for another tile are received at graphics core 230 from graphics color/Z tile buffer 340. According to one embodiment, graphics core 230 includes a pipeline engine. As a result, the rendering of the next tile at graphics core 230 may begin while the stretch BLT of the previous tile is occurring.

As described above, using a unified graphics cache architecture for tile-based rendering enables efficient supersampled images can be created without increasing external memory storage and bandwidth requirements.

Typically, a graphics engine that utilizes non-tile based rendering typically must first render an entire supersampled image to a memory location that is k times the size of original display resolution before downsampling can occur. This memory is typically too large to be implemented on the same semiconductor device as the graphics engine. Therefore, an increase in memory storage and bandwidth in main memory is required.

As described above, the unified graphics cache provides temporary storage for the supersampled image to be later filtered down (e.g., through stretch BLT). As a result, only the final image of the original size needs to be written out and stored in the main system memory, such as memory 113. Therefore, an efficient implementation of supersampling without incurring extra memory storage and bandwidth has been described.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A computer system comprising:
   a processor including:
   a central processing unit (CPU) core to execute non-graphic instructions;
   a graphics core to compute graphical transformations via supersampling techniques; and
   a unified graphics cache coupled to the graphics core to store a supersampled image.

2. The computer system of claim 1 wherein the graphics cache comprises:
   a texture cache to store texture data; and
   a color and depth buffer to store the color data and the depth data.

3. The computer system of claim 1 further comprising:
   a CPU cache coupled to the CPU core.

4. The computer system of claim 3 further comprising a bus interface coupled to the CPU cache and the graphics cache.

5. The computer system of claim 1 wherein the graphics core performs rendering according to a tile-based rendering architecture.

6. The computer system of claim 1 further comprising:
   a bus interface coupled to CPU cache and the graphics cache; and
   a main memory coupled to the bus interface.

7. The computer system of claim 2 wherein the graphics core amplifies image polygons and renders the polygons into the graphics cache.

8. The computer system of claim 7 wherein amplification of the image polygons are implemented via viewport transformation.

9. The computer system of claim 7 wherein the graphics core downsamples the image polygons after the polygons have been rendered.

10. The computer system of claim 9 wherein the downsampling of the image polygons are implemented by executing a bit aligned block transfer.

11. A method for supersampling an image comprising:
    receiving polygons of a first tile of the image at a graphics core;
    amplifying the polygons at the graphics core; and
    rendering the polygons of the first tile into a unified graphics cache, wherein the unified graphics cache stores texture data, color data and depth data of the image.

12. The method of claim 11 further comprising executing a stretch aligned block transfer at the graphics core after rendering the polygons.

13. The method of claim 11 wherein the polygons are amplified four times the original size of the image.

14. The method of claim 11 wherein the amplification is achieved using viewport transformation.

15. The method of claim 11 wherein the process of rendering the polygons comprises:
    setting up the image polygons; and
    rasterizing pixels within the image polygons.

16. The method of claim 15 further comprising texturing the pixels within the image polygons.

17. The method of claim 11 further comprising downsampling the polygons after the polygons have been rendered.

18. The method of claim 17 wherein the downsampling is achieved by executing a bit aligned block transfer.

19. The method of claim 11 further comprising:
    determining whether the unified graphics cache includes more tiles that are to be rendered; and
    if so, receiving polygons of a second tile of the image at the graphics core; and
    rendering the polygons of the second tile into the unified graphics cache.

20. A central processing unit (CPU) comprising:
    a CPU core to execute non-graphic instructions;
    CPU cache coupled to the CPU core;
    a graphics accelerator to compute graphical transformations via supersampling techniques; and
    a unified graphics cache coupled to the graphics core and the CPU, to store a supersampled image.

21. The CPU of claim 20 wherein the graphics cache comprises:
    a texture cache to store texture data; and
    a color and depth buffer to store the color data and the depth data.

22. The CPU of claim 20 wherein the graphics core amplifies image polygons and renders the polygons into the graphics cache.

23. The CPU of claim 22 further comprising a bus interface coupled to the CPU cache and the graphics cache.

24. The CPU of claim 23 wherein the graphics accelerator performs rendering according to a tile-based rendering architecture.

* * * * *

UNITED STATES PATENT AND TRADEMARK OFFICE
CERTIFICATE OF CORRECTION

PATENT NO. : 6,885,378 B1
DATED : August 26, 2005
INVENTOR(S) : Tsai et al.

It is certified that error appears in the above-identified patent and that said Letters Patent is hereby corrected as shown below:

Column 1,
Line 26, delete "abasing" and insert -- aliasing --.

Column 3,
Line 37, delete "327" and insert -- 32 --.

Signed and Sealed this

Fifth Day of July, 2005

JON W. DUDAS
*Director of the United States Patent and Trademark Office*